United States Patent [19]

Whitescarver

[11] 4,187,087
[45] Feb. 5, 1980

[54] HANDLING FLUID DISCHARGED FROM A CONDUIT AT A HIGH VELOCITY

[75] Inventor: Olin D. Whitescarver, Santa Rosa, Calif.

[73] Assignee: Union Oil Company of California, Brea, Calif.

[21] Appl. No.: 819,177

[22] Filed: Jul. 26, 1977

[51] Int. Cl.² ............................................. B01D 19/00
[52] U.S. Cl. ........................................ 55/43; 55/46; 55/191; 55/204; 55/242; 55/276
[58] Field of Search .................. 55/41, 43, 46, 52, 92, 55/191, 204, 237, 261, 276, 242; 60/641; 165/45; 166/75 R, 79, 267, 314; 175/66

[56] References Cited

U.S. PATENT DOCUMENTS

| | | | |
|---|---|---|---|
| 3,113,843 | 12/1963 | Li | 55/52 X |
| 3,605,403 | 9/1971 | Aikawa et al. | 60/641 |
| 3,862,545 | 1/1975 | Ellis | 60/641 |

OTHER PUBLICATIONS

Dench, N. D., "Silencers for Geothermal Bore Discharge," Proceedings of U.N. Conference on New Sources of Energy, vol. 3, pp. 134–141, 1961.

Snyder, Robert E., "How Steam is Produced and Handled at the Geysers," World Oil, pp. 43–48, Jun. 1975.

*Primary Examiner*—Frank A. Spear, Jr.
*Assistant Examiner*—Richard W. Burks
*Attorney, Agent, or Firm*—Dean Sandford; Gerald L. Floyd

[57] ABSTRACT

An apparatus and method for handling a fluid stream containing gas, liquid and solid particulate matter, which fluid stream issues from a conduit at a high velocity, such as from a geothermal well during the drilling, producing, testing or treating of the well. The fluid is passed first through an expansion conduit comprising a series of axially-aligned sections of increasing cross-sectional area and then through a vertical separator for particulate matter and noxious materials. Means is provided for injecting a treating material into either the conduit leading from the well to the expansion-conduit, the expansion conduit or the vertical separator.

22 Claims, 3 Drawing Figures

HANDLING FLUID DISCHARGED FROM A CONDUIT AT A HIGH VELOCITY

BACKGROUND OF THE INVENTION (1) Field of the Invention

This invention relates to an apparatus and method for handling the discharge from a conduit of a high velocity fluid stream containing gas, liquid and solid particulate matter. More particularly the invention relates to such an apparatus and method for reducing the noise level created by the high velocity fluid discharge and for separating out or treating portions of the fluid deleterious to the environment into which the fluid is discharged. Such a high velocity fluid stream is typically discharged from a geothermal well during the drilling, producing, testing or treating thereof.

(2) Description of the Prior Art

In many industrial processes there is need to discharge from a high pressure environment to the atmosphere or to a lower pressure environment a body of fluid containing gas, liquid and solid particulate matter. In such an operation, the fluid characteristically flows at a high velocity. Such a discharge is often characterized by environmental pollution, e.g., by a high noise level and contamination of the atmosphere or the lower pressure environment by the constituents of the fluid.

One such industrial process where the discharge of a high velocity fluid to the atmosphere is encountered is the drilling of a well into a subterranean reservoir containing a high pressure fluid and the subsequent producing, testing, treating or cleaning of the well. Some subterranean reservoirs contain high temperature, high pressure geothermal fluids containing gas and water in the form of steam or water which flashes to steam on depressuring. The drilling of wells penetrating geothermal zones presents several problems. Such zones are generally relatively porous and permeable. Thus, if the liquid drilling mud used to drill the portions of the reservoir above the geothermal zone is also used to drill through the geothermal zone, the weight of the column of liquid drilling fluid in the well is so great that all or an appreciable amount of the drilling fluid invades and is lost to the geothermal zone. This necessitates use of a large additional volume of drilling fluid and causes highly undesirable partial plugging of the zone by the drilling fluid or the formation drill cuttings. When the well is subsequently completed and attempts are made to produce the geothermal fluid via the well, this plugging decreases the production rate. In order to reduce contamination of the geothermal zone, it is generally the practice to employ, as a relatively low density drilling fluid having a reduced tendency to invade and contaminate the surrounding reservoir, a gas such as air, nitrogen, carbon dioxide, combustion gases or the like, or a gas-containing liquid such as a foam or aerated fluid. With these gaseous or gas-containing drilling fluids, it is necessary to maintain a high rate of circulation through the drill string during drilling to adequately remove cuttings from the well. This high rate of circulation of gaseous or gas-containing drilling fluids and cuttings, plus concomitant production of steam and other gases and liquids present in the reservoir and escaping during drilling, results in a highly variable volume of flow of hot fluid at a high flow velocity out of the well through a small diameter pipe at the wellhead. The conditions of high volume flow of a hot fluid at a high flow velocity can arise also when testing, treating or cleaning a geothermal well. Likewise, similar flow conditions can exist when drilling, testing, treating or cleaning a well penetrating a gaseous hydrocarbon-containing formation, and particularly when such wells are drilled with air or other gas as the drilling fluid or as a constituent of the drilling fluid. Similarly in numerous other industrial processes there is produced a high pressure fluid containing gas, liquid and solid particulate matter which fluid must be transferred to a lower pressure environment.

In the transfer of these fluids from a high pressure environment to a low pressure environment or the atmosphere, contamination of the new environment can occur. This contamination can be in the form of noise created by the high velocity flow of fluids. Other sources of contamination are the solid particulate matter and noxious materials which may be contained in the fluid which is discharged into the new environment. For example, in handling the discharge from a geothermal well being drilled, the exit velocity of the discharge is often in the supersonic range resulting in a noise intensity which can be great enough to at least temporarily damage the hearing of those working in the vicinity of the well. Even at a distance of several miles from the well, the noise level is annoying. The fluid discharged from a geothermal well during drilling contains a high percentage of air, steam and other gases which do no particular harm to the atmosphere. Thus, these portions of the fluid can be separated and vented directly to the atmosphere without further treatment. However, the fluid also contains cuttings and other solid particulate matter eroded from the reservoir during circulation in the well. These solid materials must be separated from the fluid stream and collected for further disposal before the fluid stream is discharged into the atmosphere. Similarly any noxious material in the fluid stream such as boron or objectionable gases, for example hydrogen sulfide, or ammonia, must be separated or converted to a less objectionable form before discharging the fluid stream into the atmosphere.

Several approaches to noise abatement for fluids from producing geothermal wells are described in "Silencers for Geothermal Bore Discharge", N. D. Dench, *Proceedings of the United Nations Conference on New Sources of Energy,* Vol. 3, Geothermal Energy: II, pp. 134–141, United Nationa (1964), Conference held Aug. 21–31, 1961. One approach is the horizontal straight-through type of silencer which is a series of several lengths of horizontally-positioned, axially-aligned pipes of increasing diameter connected to the relatively small diameter pipe carrying the fluid stream from the well. As the fluid passes through the sections of pipe of increasing diameter, the flow velocity decreases as the pipe diameter increases. By the time the fluid exits the largest diameter pipe section and discharges to the atmosphere, the flow velocity has been decreased to such an extent that the noise level has been substantially reduced. However, no substantial reduction in the amount of solid particulate matter or noxious substances vented to the atmosphere is achieved using this apparatus.

Another approach described by Dench is to pass the fluid effluent from the well through a vertical cyclone silencer. Water is separated and discharged out the bottom of the silencer while the steam and other gases are vented to the atmosphere out the top of the silencer. The vertical silencer achieves reduction in noise level.

However, the silencer described is used in conjunction with producing and testing completed wells which are essentially free of solids in the form of drill cuttings. There remains a need for an apparatus and method for handling solid loaded streams and for further reducing the noise level and for preventing the discharge into the atmosphere of noxious materials present in the fluid flowing from a well.

Accordingly, a principal object of this invention is to provide an apparatus and method for handling a highly fluctuating fluid stream containing gas, liquid and solid particulate matter which fluid stream is being passed from a high pressure environment to a low pressure environment.

Another object of the invention is to provide such an apparatus and method wherein the noise produced by the passage of a fluid from a high pressure environment to a low pressure environment is diminished.

Still another object of the invention is to provide such an apparatus and method for discharging a fluid into a low pressure environment in a manner such that there is a reduction in the amounts of solid particulate matter and noxious substances discharged directly from the fluid stream into the atmosphere of the low pressure environment.

A further object of the invention is to provide such an apparatus and method for discharging a fluid into a low pressure environment in a manner which does not pollute the low pressure environment.

A still further object of the invention is to provide an apparatus and method for handling the entire fluid discharge from a geothermal well during drilling, testing, treating or cleaning thereof.

An additional object of the invention is to provide such an apparatus and method wherein the fluid discharge from a geothermal well is ultimately vented to the atmosphere after removal or alteration of the harmful constituents therein.

Another object of the invention is to provide such an apparatus and method which can be used in the sampling of the effluent from a geothermal drilling operation to ascertain compliance with appropriate air pollution control regulations.

Other objects, advantages and features of the invention will be apparent from the following description and accompanying drawings.

SUMMARY OF THE INVENTION

An apparatus and method for discharging a fluid comprising a mixture of gas, liquid and solid particulate matter at a high flow velocity from a high pressure source to a low pressure environment, such as to the atmosphere. The fluid is withdrawn from the high pressure environment via a transfer conduit and passed first through an expansion conduit comprising a series of longitudinally-disposed axially-aligned conduit sections of increasing cross-sectional area, and then through a vertical separator to effect removal of the solid particulate matter and noxious substances. Either the transfer conduit, the expansion conduit, and/or the vertical separator may be provided with means for injecting a treating material into the fluid. The use of this apparatus results in less contamination of the low pressure environment such as by noise and/or components of the fluid.

The apparatus and method is particularly useful in the discharge of effluents from a well to the atmosphere during an air drilling operation, and particularly in discharging to the atmosphere the effluent from a well drilled into a geothermal zone of a subterranean reservoir during the drilling, testing, treating, or cleaning of the well.

DETAILED DESCRIPTION OF THE INVENTION

Figure 1:
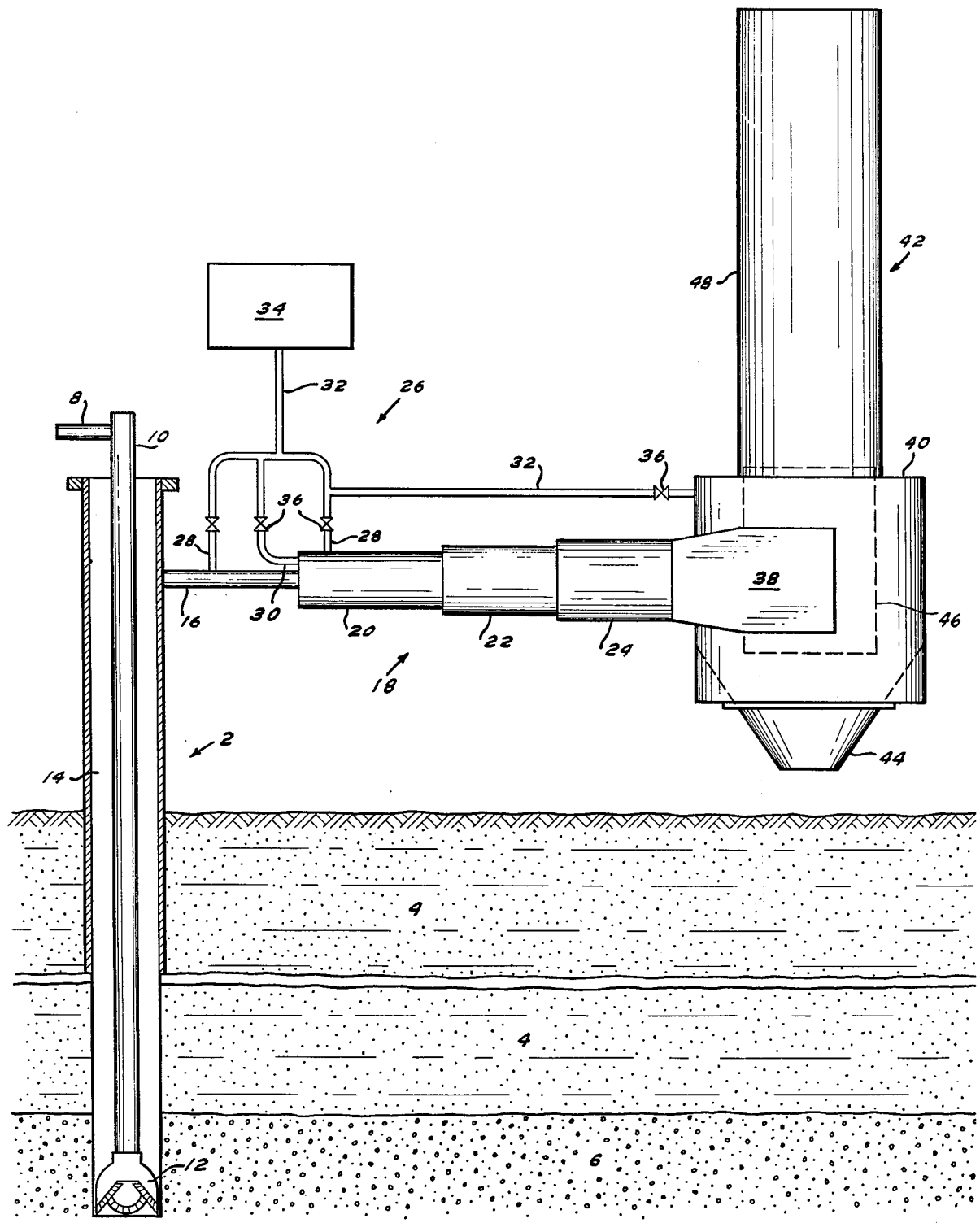
FIG. 1 is a vertical cross-sectional view schematically illustrating a well equipped with the apparatus of this invention.

Referring specifically to FIG. 1, well 2 is drilled through overburden 4 and into underlying geothermal strata 6. Gas-containing drilling fluid is introduced via conduit 8 and circulated down drill string 10, through drill bit 12, up annulus 14 surrounding drill string 10 and out of well 2 through transfer conduit 16. During its circulation through well 2, the drilling fluid picks up cuttings, noxious fluids and other fluids from geothermal strata 6 and carries these materials out of well 2 with it. The mixture of drilling fluid and entrained materials passes through transfer conduit 16 at a high flow velocity and enters smallest cross-sectional area section 20 of multi-stage expansion conduit 18 which is composed of three longitudinally-disposed axially-aligned conduit sections 20, 22 and 24, each section of which has a larger cross-sectional area than the preceding section. Sections 20, 22 and 24 of expansion conduit 18 are preferably horizontally positioned. Section 20 of expansion conduit 18 has a larger cross-sectional area than transfer conduit 16. The apparatus is also equipped with water and/or chemical injection means 26 through which water and various chemicals can be injected to treat the drilling fluid and entrained materials. Water and chemical injection means 26 can be the same or separate systems and can be positioned on conduit 16, expansion conduit 18, vertical separator 42 or any combination thereof.

Injection means 26 can be any means for introducing water or treating chemicals into the stream of drilling fluid and entrained materials flowing through the apparatus. As shown in FIG. 1, injection means 26 is conveniently made up of perpendicular nozzles 28 and parallel nozzles 30 which conveniently can be connected via feed lines 32 to source of treating chemical 34. Feed lines 32 contain flow control valves 36 which can be used to control the relative amounts of treating water or chemical flowing into transfer conduit 16, expansion conduit 18 and vertical separator 42. The amount of water or chemical injected can also be controlled by regulating pumps at source 34. The water or treating chemicals introduced through perpendicular nozzles 28 enter the flow stream of drilling fluid and entrained materials perpendicular to the direction of flow thereof and tend to mix with the flow stream. The treating chemicals introduced through parallel nozzles 30 enter the flow stream parallel to the direction of flow and tend to flow along the sidewall of the conduit carrying the flow stream to provide a liquid blanket along the sidewall to minimize erosion thereof by particulate material in the fluid stream.

Figure 3:
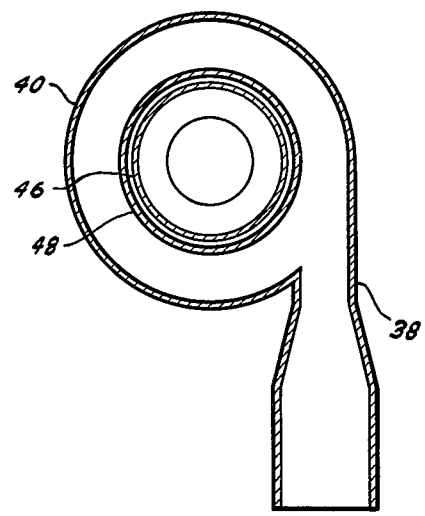
FIG. 3 is a horizontal sectional view taken along line 3—3 of FIG. 2.
Figure 2:
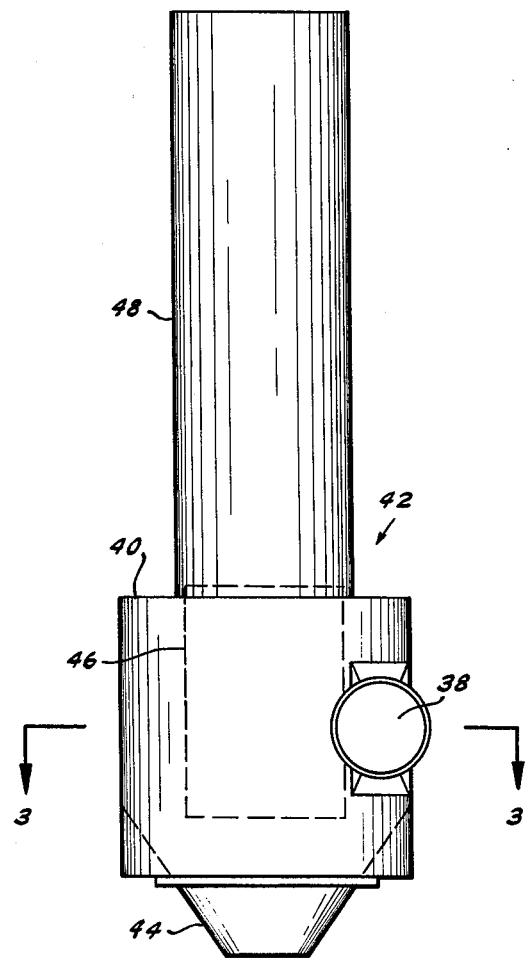
FIG. 2 is a vertical view schematically illustrating the vertical separator of the invention.

As the fluid discharge from well 2 passes successively through conduit sections 20, 22 and 24 of expansion conduit 18, the flow velocity of the fluid decreases. Referring now to FIGS. 1, 2, and 3, the fluid discharge passes out of conduit section 24 into conduit 38, one end of which is axially aligned with conduit section 24 and the other end of which is connected to vertical cylindrical main separator section 40 of vertical cyclone separator 42. Conduit 38 is perpendicularly aligned with the sidewall of main separator section 40 near one edge thereof so that the fluids tangentially enter main separator section 40 and are projected into a circular path therearound. Conduit section 24 fits in sliding engagement with conduit 38 wit a packoff (not shown) therebetween to minimize back flow of the fluid stream. The sliding engagement arrangement helps compensate for the expansion and vibration stresses which are present in the apparatus. As the fluid discharge travels in a circular path around main separator section 40, it is further reduced in flow velocity and separates into solid and liquid portions which, due to the force of gravity, mostly fall into cone bottom separator section 44 which is attached to the lower end of main separator section 40 and exit the lower end of bottom separator section 44 into a container (not shown) positioned therebelow or onto the ground from which they may be periodically removed. The upper end of cone bottom separator section 44 extends up into main separator section 40 to the sidewall thereof. This structure decreases accumulation and possible reentrainment of treating material and/or separating particulate material that might otherwise occur along the horizontal bottom of main separator section 40. The gaseous portion of the fluid discharge travels downward in a circumferential path in the annulus between main separator section 40 and chimney tube 46, around the bottom of chimney tube 46, up through chimney tube 46, out through vertical stack 48 which is attached to the upper end of main separator section 40 and is finally discharged to the atmosphere.

A wide variety of treating chemicals can be injected into the fluid stream via injection means 26 depending on the nature of the noxious materials present in the fluid stream. In some fluid streams, even those already containing some water, it has been found that the addition of water decreases the amount of solid particulate matter discharged into the atmosphere via vertical stack 48 and further reduces noise levels. Other treating chemicals which react with hydrogen sulfide contained in the fluid stream include an aqueous solution of a strong alkali, for example, sodium hydroxide, calcium hydroxide, ammonium hydroxide, sodium carbonate, zinc carbonate or potassium carbonate or an aqueous solution of an oxidizing agent, for example, hydrogen peroxide, zinc oxide or ferric oxide. Other noxious components such as ammonia and boron can be absorbed or changed into a less objectionable form by injecting into the fluid stream water, an aqueous solution of an acid, such as a mineral or carboxylic acid and the like.

The invention is further described by the following examples which are illustrative of specific modes of practicing the invention and are not intended as limiting the scope of the invention as defined by the appended claims.

EXAMPLES 1-5

An 8¾ inch diameter well is being air drilled into a subterranean geothermal formation. Upon penetrating the geothermal zone, the well is producing steam at the rate of 100,000 pounds per hour through a 6 inch orifice located in the transfer conduit downstram of the wellhead. The well is then equipped with an expansion conduit and a vertical separator as shown in FIG. 1-3. The transfer conduit has an outside diameter of 13⅜ inches and a length of 35 feet. The expansion conduit is made up of three sections of conduit of increasing diameter. The first section has an outside diameter of 20 inches and a length of 9 feet 3 inches. The second section has an outside diameter of 24 inches and a length of 8 feet. The third section has an outside diameter of 30 inches and a length of 10 feet. The diameter of the main separator section is 10 feet. The diameter of the chimney tube is 7 feet and the diameter of the stack of the vertical separator is 8 feet. Tests are made wherein the amount of solid particulate matter discharged to the atmosphere through the vertical stack of the vertical separator during the drilling operation is measured. Tests are made with and without injection of water into the fluid discharge stream. When used, water is injected into the expansion conduit via ten 1 inch by 0.5 inch slots using the water injection means shown in FIG. 1. This injection produces a heavy spray of water perpendicular to the stream flow in the expansion conduit. Water causes agglomeration of solid particles and cuts down on erosion of the fluid handling equipment. The sampling of solid particulate matter is conducted during normal drilling operations using a Bay Area Air Pollution Control District source sampling train consisting of two fiberglass-packed glass thimbles behind a sampling nozzle and followed by two Greenberg-Smith impingers partially filled with pure water, a dry trap, a Sprague gas meter and a vacuum pump. Sampling for each test is conducted by traversing with the sampling nozzle and thimbles in the vertical stack at 10 points along two diameters 90 degrees apart. The results of these tests are shown in following Table 1. These results show that the amount of solids lost to the atmosphere is decreased sharply by injection of water into the expansion conduit. A nominal water injection rate of between about 30 and 100 gallons per minute is most effective.

TABLE 1

Discharge Of Solid Particulate Matter To The Atmosphere During Drilling Operations Of A Geothermal Well Using An Expansion Conduit And A Vertical Separator

| Test No. | Water Injection Rate (gallons/min.) | Type of Water | Drilling Rate (feet/hour) | Solids Drilled (pounds/hour) | Solids Discharged to Atmosphere (pounds/hour) | Efficiency (percent) |
|---|---|---|---|---|---|---|
| 1 | — | — | 7.2 | 497 | 233 | 53 |
| 2 | — | — | 8.1 | 559 | 307 | 45 |
| 3 | 30 | sump* | 10.6 | 732 | 10.6 | 97 |
| 4 | 60 | sump* | 8.5 | 587 | 8.5 | 96 |

TABLE 1-continued
Discharge Of Solid Particulate Matter To The Atmosphere
During Drilling Operations Of A Geothermal Well Using An
Expansion Conduit And A Vertical Separator

| Test No. | Water Injection Rate (gallons/ min.) | Type of Water | Drilling Rate (feet/ hour) | Solids Drilled (pounds/ hour) | Solids Discharged to Atmosphere (pounds/ hour) | Efficiency (percent) |
|---|---|---|---|---|---|---|
| 5 | 60 | fresh | 8.2 | 566 | 8.2 | 90 |

*Water previously discharged from the well during drilling and collected in a sump.

EXAMPLES 6-9

During the drilling of the well described in Examples 1-5, noise level measurements are made using a noise level meter. Measurements are made at a distance of 25 feet from the well to minimize the contribution to the noise level of other noise sources, such as the well drilling equipment. Measurements are made during drilling of the well both without installation of any noise abatement equipment and with installation of various combinations of the apparatus of this invention. The results of these tests are shown in following Table 2. These results show that the use of the expansion conduit alone results in a reduction of the noise level. Use of both the expansion conduit and the vertical separator further reduces the noise level. By adding the injection of water as a treating fluid, the noise level is still further reduced. A reduction of 10 decibels on the A scale makes the sound level half as loud.

TABLE 2
NOISE LEVEL OF A DRILLING GEOTHERMAL WELL WITH AND WITHOUT NOISE ABATEMENT EQUIPMENT

| No. | Noise Abatement Equipment | Steam Production Rate (pounds/ hour) | Noise Level [dB(A)] |
|---|---|---|---|
| 6 | none - free venting | 270,000 | 128 |
| 7 | expansion conduit | 200,000 | 109-121 |
| 8 | expansion conduit and vertical separator | 200,000 | 93-96 |
| 9 | expansion conduit, vertical separator and water injection* | 200,000 | 83-84 |

*water injected at a rate of 60 gallons per minute.

Various embodiments and modifications of this invention have been described in the foregoing specification, and further modifications will be apparent to those skilled in the art. Such modifications are included within the scope of this invention as defined by the following claims.

Having now described my invention, I claim:

1. An apparatus for transferring a fluid comprising a mixture of gas, liquid and particulated solids from a high pressure source to a low pressure environment at a high flow velocity comprising:
   (a) a transfer conduit attached to the high pressure source for withdrawing the fluid therefrom,
   (b) an expansion conduit comprising a series of axially-aligned and longitudinally-disposed connected conduit sections of increasing cross-section area, the section having the smallest cross-sectional area being connected to the transfer conduit,
   (c) a vertical separator connected in sliding engagement to the section of the expansion conduit having the largest cross-sectional area, and
   (d) means for injecting a treating material into the fluid flowing through said apparatus.

2. The apparatus defined in claim 1 wherein the means for injecting a treating material into the fluid flowing through said apparatus is connected to the section of the expansion conduit having the smallest cross-sectional area.

3. The apparatus defined in claim 1 wherein the means for injecting a treating material into the fluid comprises a header connected both to a source of treating material and to one or more nozzles connected to the said apparatus.

4. The apparatus defined in claim 1 wherein the means for injecting a treating material into the fluid is one or a plurality of separate injecting means.

5. The apparatus defined in claim 1 wherein the vertical separator is a cyclone separator.

6. The apparatus defined in claim 1 wherein the low pressure environment is the atmosphere.

7. The apparatus defined in claim 1 wherein the means for injecting a treating material into the fluid is connected to the transfer conduit.

8. The apparatus defined in claim 1 wherein the means for injecting a treating material into the fluid is connected to the expansion conduit.

9. The apparatus defined in claim 1 wherein the means for injecting a treating material into the fluid is connected to the main separator section of the vertical separator.

10. The apparatus defined in claim 3 wherein the nozzles are perpendicular to the direction of flow through the apparatus.

11. The apparatus defined in claim 3 wherein the nozzles are parallel to the direction of flow of the fluid through the apparatus.

12. A method for discharging a fluid comprising a mixture of gas, liquid and particulated solids from a high pressure source into a low pressure environment at a high flow velocity with reduced adverse affect on the low pressure environment comprising:
   (a) withdrawing the fluid from a high pressure environment via a transfer conduit,
   (b) passing the fluid next through an expansion conduit comprising a series of axially-aligned and longitudinally-disposed connected conduit sections of increasing cross-sectional area, the section of which having the smallest cross-sectional area is connected to the transfer conduit,
   (c) passing the fluid next through a vertical separator connected to the largest diameter section of the expansion conduit and into the low pressure environment, and (d) introducing a treating material into the fluid.

13. The method defined in claim 12 wherein the fluid discharged is produced from a well.

14. The method defined in claim 13 wherein the well is a geothermal well.

15. The method defined in claim 12 wherein the low pressure environment is the atmosphere.

16. The method defined in claim 12 wherein the adverse affect is the noise level.

17. The method defined in claim 12 wherein the adverse affect is contamination of the low pressure environment by constituents of the fluid.

18. The method defined in claim 12 wherein a treating material is introduced into the fluid during its passage through the transfer conduit.

19. The method defined in claim 12 wherein the treating material is water.

20. The method defined in claim 12 wherein a treating material is introduced into the fluid during its passage through the expansion conduit.

21. The method defined in claim 12 wherein a treating material is introduced into the fluid during its passage through the main separator section of the vertical separator.

22. The method defined in claim 20 wherein the treating material is introduced into the fluid during its passage through the smallest diameter section of the expansion conduit.

* * * * *